Duncan Shaw
Circular Saw-Set.

No. 120,542.  Patented Oct. 31, 1871.

Attest
H. H. Mitchell
Benj Bringelman

Inventor
Duncan Shaw

+No. 120,542

UNITED STATES PATENT OFFICE.

DUNCAN SHAW, OF CINCINNATI, OHIO.

IMPROVEMENT IN SAW-SETS.

Specification forming part of Letters Patent No. 120,542, dated October 31, 1871.

*To all whom it may concern:*

Be it known that I, DUNCAN SHAW, of Cincinnati, in the county of Hamilton and State of Ohio, have invented certain Improvements in Circular-Saw Sets, of which the following is a specification, reference being had to the accompanying drawing.

My invention consists of a novel device for holding a circular saw and setting its teeth, as hereinafter more fully explained.

Figure 1:
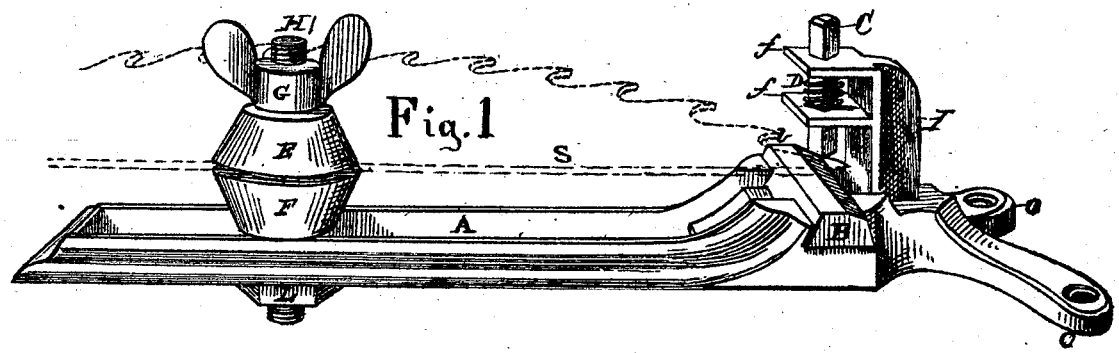
Figure 2:
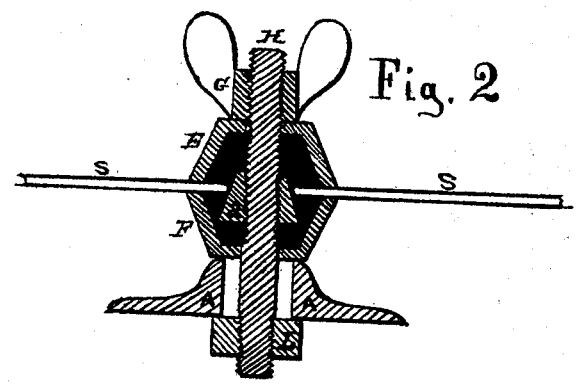

Figure 1 is a perspective view of the apparatus complete, and Fig. 2 is a vertical section of a portion thereof.

To make my improved apparatus, I first provide a frame, which consists of a metallic bar or bed-plate, A, slotted longitudinally and provided at one end with prongs $o$, having holes for screwing it fast to a bench or table. Near this last-mentioned end it has a vertically-projecting stud, I, which has on its face two laterally-projecting flanges, $f$, as shown in Fig. 1. These flanges $f$ have a hole bored through them vertically, and in these holes is placed loosely a steel punch, C, which has on it a spiral spring, D, so arranged as to hold the punch up when free from pressure. In the bed or frame A, at a point directly under the punch C, is formed a dovetailed recess extending transversely across its face, and in this recess is fitted a solid bar, B, the upper face of which is divided into two parts, the front part being horizontal, while the rear face $c$ is inclined or beveled, as represented in Fig. 1. This bar B may be removed so as to be replaced at will by others having faces more or less inclined in order to give more or less set to the teeth of the saw, as may be required. In the slot of the frame A I place a screw-bolt, H, having a nut, L, or a head on its lower end. Upon this bolt I then place a conical washer, F, which is hollow, and within this, on the bolt H, I screw a conical piece, $a$, with its smaller end uppermost, as shown in Fig. 2. Above this, on the bolt, I place another hollow or cup-shaped washer, E, and above that place a thumb-nut, G, which completes the apparatus.

The method of using it is as follows: The thumb-nut and upper washer are removed and a saw, S, is slipped on the bolt H, the conical piece or plug $a$ being adjusted so as to fill the eye or hole in the center of the saw, while the latter rests on the upper face of the lower washer F, by which means the saw is perfectly centered on the bolt H. The washer E and thumb-nut G are then replaced and the latter screwed down, thus clamping the saw firmly in place between the two washers E and F. This being done the bolt H is so adjusted in the slot of the frame A as to bring its teeth over the bar or anvil B to the proper position, when by striking on the punch C the tooth directly under it is hit and bent down upon the inclined face $c$, thereby giving to it the required set. By turning the saw so as to bring each alternate tooth in succession under the punch and striking them, all the teeth on one side are thus set in succession. When this is done the saw is turned over on the frame and those of the other side set in the same manner.

By these means I produce an apparatus that sets the teeth with uniformity, and that is adapted to saws of all sizes, and that enables the work to be done with rapidity and accuracy.

Having thus described my invention, what I claim is—

A set for circular saws, consisting of the adjustable centering and clamping device, in combination with the frame A provided with the beveled anvil B and spring punch C, all constructed and arranged to operate substantially as described.

DUNCAN SHAW.

Witnesses:
J. B. ONG,
EDWARD COLSTON. (131)